United States Patent [19]

Bowyer

[11] Patent Number: 5,016,523
[45] Date of Patent: May 21, 1991

[54] ADJUSTABLE MOUNTING APPARATUS FOR AIR-OPERATED DIAPHRAGM BRAKES

[75] Inventor: John P. Bowyer, Muskegon, Mich.

[73] Assignee: Anchorlok Corp., Muskegon, Mich.

[21] Appl. No.: 452,698

[22] Filed: Dec. 18, 1989

[51] Int. Cl.$^5$ .............................................. F01B 7/00
[52] U.S. Cl. ......................................... 92/63; 92/64; 92/130 A; 92/146; 92/161
[58] Field of Search ................. 92/59, 48, 49, 63, 100, 92/101, 128, 146, 161, 64; 180/170

[56] References Cited

U.S. PATENT DOCUMENTS

| | | |
|---|---|---|
| 3,331,291 | 7/1967 | Rumsey . |
| 3,402,792 | 9/1968 | Masser . |
| 3,439,585 | 4/1969 | Herrera . |
| 3,613,515 | 10/1971 | Swander, Jr. ............................ 92/63 |
| 3,630,093 | 12/1971 | Morse et al. . |
| 3,730,056 | 5/1973 | Swander, Jr. ............................ 92/48 |
| 3,811,365 | 5/1974 | Gordon et al. . |
| 3,885,458 | 5/1975 | Wright . |
| 3,926,094 | 12/1975 | Kurichh et al. . |
| 3,943,829 | 3/1976 | Newstead et al. . |
| 4,160,472 | 7/1979 | Blackstone . |
| 4,259,895 | 4/1981 | Owens ................................... 92/161 |
| 4,263,840 | 4/1981 | Herrera . |
| 4,480,530 | 11/1984 | Holmes ................................... 92/63 |
| 4,565,120 | 1/1986 | Gray et al. . |
| 4,729,290 | 3/1988 | Ewald et al. . |
| 4,793,449 | 12/1988 | Smith . |

FOREIGN PATENT DOCUMENTS 2414051 10/1974 Fed. Rep. of Germany .......... 92/63

Primary Examiner—John T. Kwon
Assistant Examiner—Thomas Denion

[57] ABSTRACT

An air-operated diaphragm spring brake (10) is provided with a mounting means (16) which permits adjustment of the position of the pneumatic ports (30, 32) on the brake with respect to the vehicle. The mounting means (16) comprises a plate (84) mounted to an end section (88) of a housing (82) overlying a central aperture (90). A pair of threaded mounting studs (96) are fixedly secured to the plate (84) for mounting the plate to the vehicle.

20 Claims, 4 Drawing Sheets

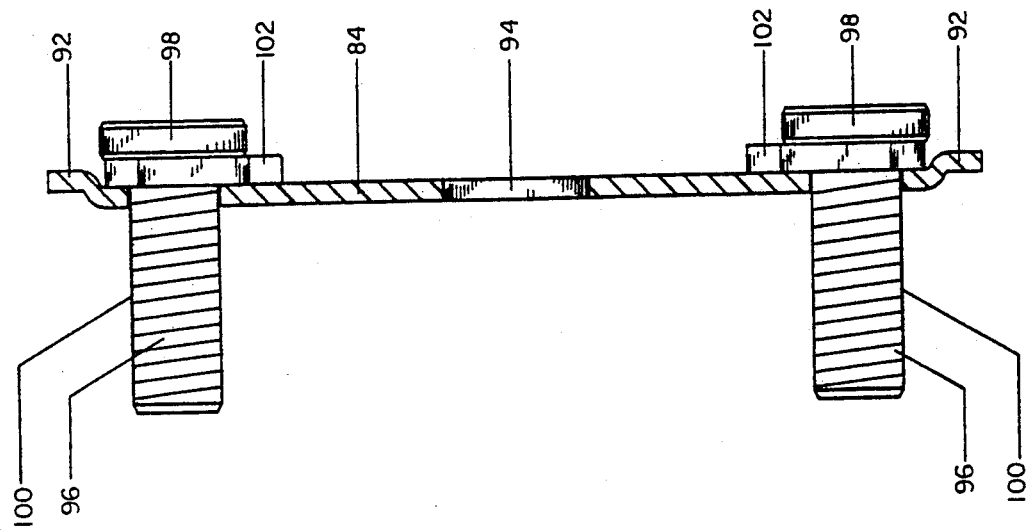
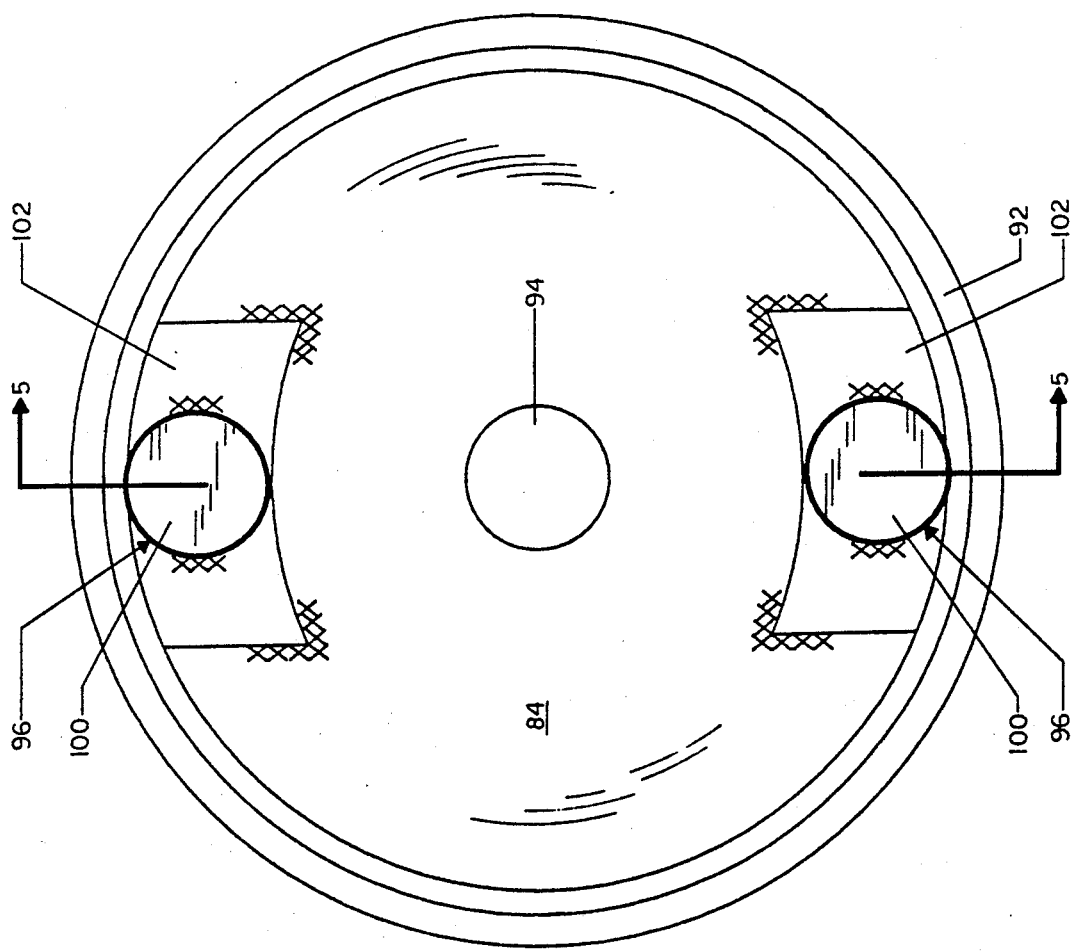

4,016,523

ADJUSTABLE MOUNTING APPARATUS FOR AIR-OPERATED DIAPHRAGM BRAKES

BACKGROUND OF THE INVENTION

1. Field of the Invention

This invention relates to air-operated diaphragm brakes used with air brake systems on vehicles such as trucks. More particularly, the invention relates to an adjustable apparatus for mounting an air-operated diaphragm brake to a vehicle whereby the pneumatic ports may be readily adjusted to a preselected position during installation of the brake.

2. State of the Prior Art

A typical air brake system for a vehicle such as a bus, truck or the like includes separate brake means such as a brake shoe and drum of the vehicle wheels. The brake shoes are actuated in one direction to apply the brakes and in the other direction to release the brakes. The brake means may serve as both service and emergency brakes, and individual brake actuators are located adjacent the wheels for actuation of the brake means.

A typical brake actuator includes a service brake actuator for applying and releasing the brakes in response to delivery and exhaust of compressed air. Often, a spring brake actuator is disposed in tandem with the service brake actuator. The spring brake actuator uses the force of a strong compression spring to operate the tandem mounted service brake actuator and to apply the brakes when air in a spring chamber is reduced below some predetermined level. Air may be reduced in the spring brake actuator under the control of the operator in the manner of a parking brake, or automatically in emergencies such as the failure of portions of the brake air system.

Thus, in a typical tandem air-operated diaphragm spring brake system, two pneumatic ports are provided, one for the service brake, and one for the spring or emergency brake. The service brake chamber and spring brake chamber are typically separated by an adapter housing which forms a wall between the two chambers, and the pneumatic ports are provided in the adapter housing.

It is known to form the spring chamber by securing a spring housing to a spring side of the adapter housing with a permanent, fluid-tight seal. The seal may be formed by providing the spring housing with an integral annular shoulder and an extended lip portion which is roll formed or swaged over an annular flange of the adapter housing. Alternatively, the spring housing may have an annular flange which is clamped to the adapter housing by a separate clamp band. A spring diaphragm is interposed between the annular flange and the annular shoulder to form the fluid-tight seal. Similarly, the service brake housing may be secured to the adapter housing with a similarly configured permanent formed or clamped seal. However, brake actuators of the this construction are typically mounted to vehicles by means of bolts or studs projecting from the end of the service brake housing. When the service brake housing is permanently sealed to the adapter housing, the mounting studs are fixed in orientation with respect to the pneumatic ports extending from the adapter housing. Thus, when the brake is mounted to the vehicle, the pneumatic ports may be positioned where it is difficult or impractical to connect air conduits to the pneumatic ports. In other words, different vehicles require different orientations of the mounting studs with respect to the pneumatic ports.

SUMMARY OF THE INVENTION

In accordance with the invention, an air-operated diaphragm spring brake is provided for a vehicle of the type having a mounting support and a pneumatic supply line for delivery of air to the brake. The brake comprises a housing which at least partially defines a chamber. A push rod extends outwardly from within the chamber for reciprocating movement generally along its own longitudinal axis between operative and inoperative positions. A diaphragm is provided within the chamber for actuating the push rod in response to the delivery and exhaust of pressurized air, and the housing has a pneumatic port for delivering air to the chamber.

The invention is directed to an improvement wherein the housing has first and second members. The first member is adapted to be fixedly mounted to the mounting support, and the pneumatic port is located on the second member. The first and second members have interengaging portions to permit movement of the second member and the pneumatic port with respect to the first member in a manner whereby the housing may be mounted to different vehicles which have different relationships between mounting supports and pneumatic supply lines.

In one aspect of the invention, the housing has an end section and an oblique side surface, with the push rod projecting through the end section and the pneumatic port being located on the side surface. The mounting means comprises a plate rotatably mounted to the end section for rotation about the longitudinal axis, and the plate has a central aperture for receiving the push rod. Preferably, a pair of threaded studs is fixedly secured to the plate for mounting the plate to the vehicle.

In another aspect of the invention, the end section has an inwardly directed annular flange which defines an opening. The plate is circular and has a peripheral shoulder. The shoulder mounts the annular flange so that the plate is disposed within the opening. A spring is preferably disposed within the chamber to urge the shoulder into abutting engagement with the annular flange. The spring can further be adapted to urge the push rod into the inoperative position. In such case, the spring preferably has a first end adjacent the diaphragm and a second end adjacent the plate whereby the second end is centered about the central aperture.

BRIEF DESCRIPTION OF THE DRAWINGS

FIG. 4 is a plan view of the central plate assembly according the invention; and FIG. 5 is a cross-sectional view of the central plate assembly taken along lines 5—5 of FIG. 4.

DETAILED DESCRIPTION OF THE DRAWINGS

Figure 1:
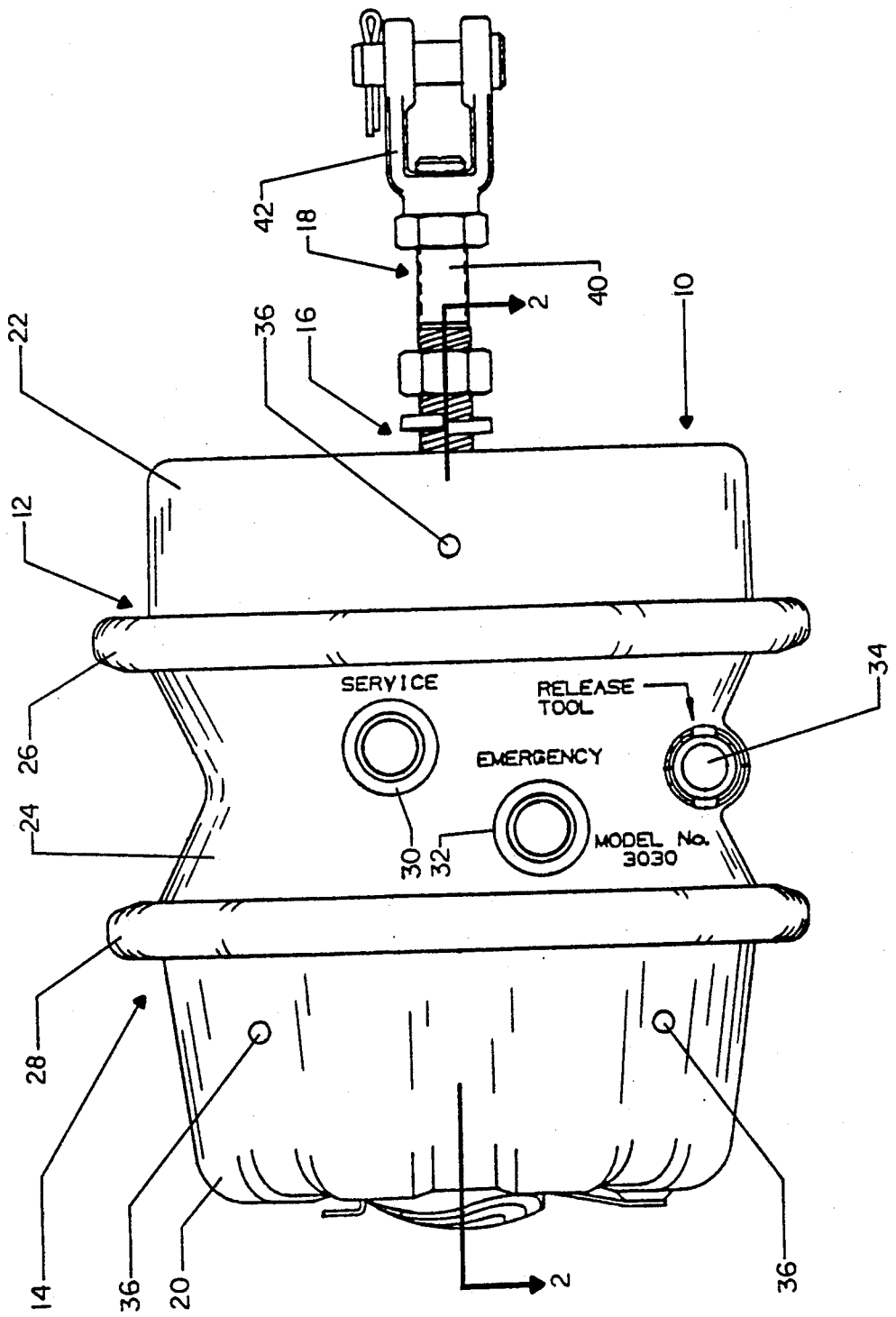
FIG. 1 is a plan view of an air-operated diaphragm spring brake having an adjustable mounting means according to the invention.

Referring now the drawings and to FIG. 1 in particular, there is shown an air-operated diaphragm spring brake 10 having a configuration well known in the art. The brake 10 comprises a service brake 12 mounted in tandem to a spring brake 14. A brake mounting means 16 is disposed at the service brake 12. An actuator means 18 projects from the service brake and is adapted to connect to and operate a conventional brake shoe and drum (not shown) in conventional fashion.

The service brake 12 comprises a cup-shaped service housing 20, and the spring brake 14 similarly comprises a cup-shaped spring housing 22. The service housing 20 and the spring housing 22 are each joined to a double cup-shaped service/spring adapter housing 24 by means of integrally formed seals 26, 28, respectively. The housing 20, 22 may also be joined to the adapter 24 by separate clamp bands when an integral seal is not used. The adapter housing 24 is provided with two pneumatic ports for delivery and exhaust of compressed air to the brake 10. The service port 30 directs air to the service brake 12, and the emergency port 32 directs air to and from the spring brake 14. A receptacle 34 is provided in the adapter housing 24 to receive and secure a release tool 35, the use of which is well known to manually disengage or render the spring brake inoperable.

Figure 2:
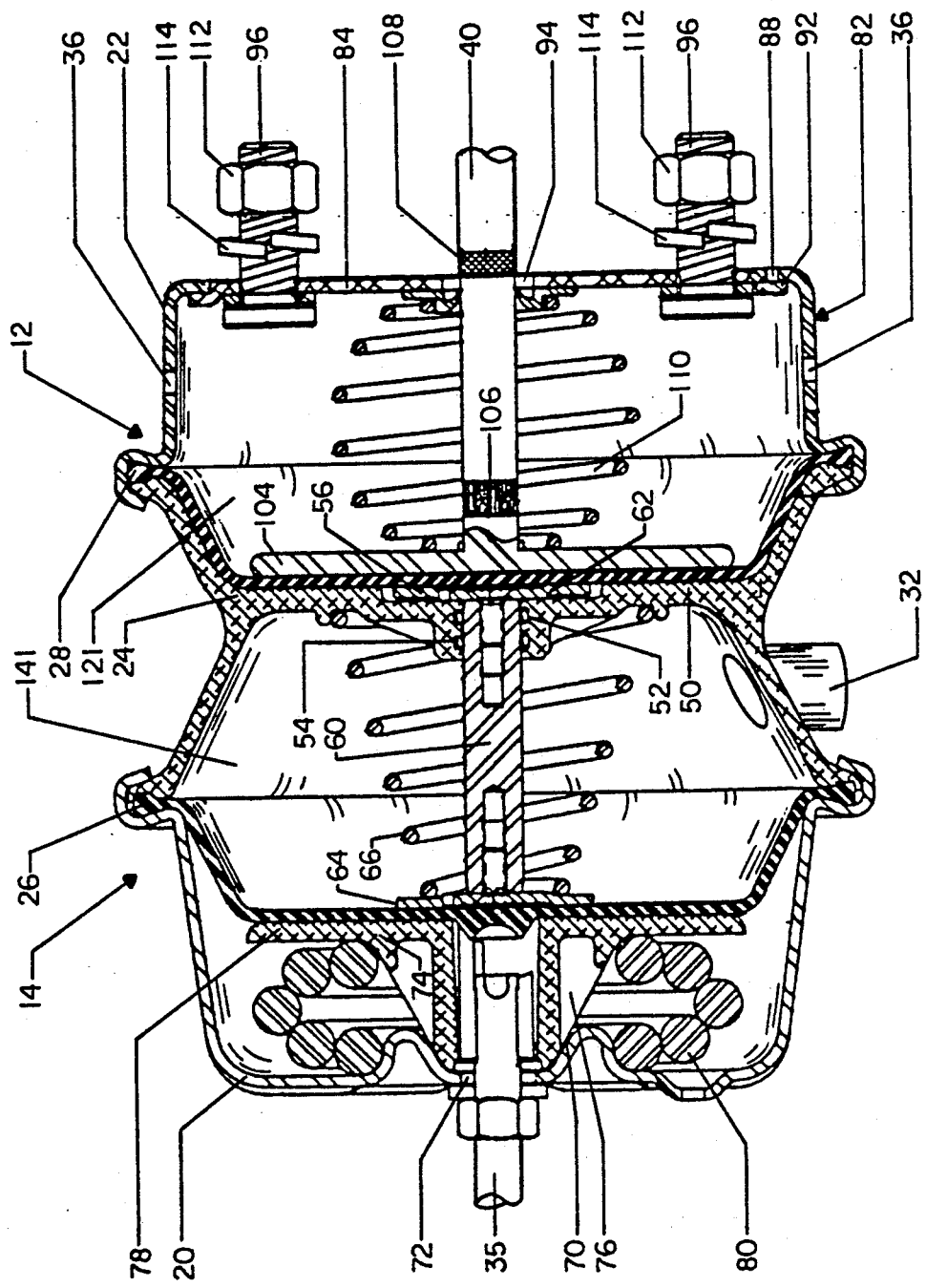
FIG. 2 is a cross-sectional view of the air-operated diaphragm spring brake taken along lines 2—2 of FIG. 1.

Referring now to both FIGS. 1 and 2, it can be seen that apertures 36 are provided on both the service housing 20 and the spring housing 22 for maintaining certain portions of the service brake 12 and spring brake 14, respectively, with ambient air pressure. A brake push rod 40 projects from the end of the service brake and is adapted for reciprocal movement to the left and right as illustrated in FIGS. 1 and 2. The push rod 40 carries a clevis 42 at an outer end thereof for connection to and operation of brake shoes and drums in conventional fashion.

Referring now, more particularly, to FIG. 2, the service/spring adapter housing 24 forms a divider wall 50 between the service brake 12 and the spring brake 14. The housing 24 has a central opening 52 in the wall 50 with one or more O-rings 54 positioned therein. An indentation or annular depression 56 is formed around the opening 52.

An elastomeric diaphragm 58 (known as the spring diaphragm) is suspended within the spring brake chamber 14' defined by the spring housing 22 and the adapter housing 24. The diaphragm 58 is compressed at the peripheral edge thereof between the adapter housing 24 and the spring housing 20 by means of the formed seal 26. An adapter push rod 60 is mounted within the spring brake chamber 14' and has a reaction plate 62 attached to one end and a pressure plate 64 attached to the other end thereof. The adapter push rod 60 extends through the opening 52 in sealing engagement with the O-rings 54. The reaction plate 62 seats within the annular depression 56 of the divider wall 50. A compression spring 66 is mounted within the spring brake chamber 14' between the divider wall 50 and the pressure plate 64 to urge the adapter push rod 60 into an inoperative position as illustrated in FIG. 2.

The spring housing 20 has formed in a central portion thereof a cup portion 70 which defines a central opening 72. A receptacle plate 74 may have a conical portion 76 with an outer surface which complements the cup portion 72 and further has a pressure plate 78 at an inner portion thereof which bears against the diaphragm 58. A strong force compression spring 80 is positioned between the pressure plate 78 and the spring housing 20 to urge the adapter push rod 60 and the push rod 40 to an operative position. Ordinarily, air pressure within the spring brake chamber 14' combined with the biasing force of compression spring 66 overcomes the force of the compression spring 80 to maintain the latter in a retracted position as illustrated in FIG. 2.

The release tool 35 may be provided within the central opening 72 of the cone receptacle 70 to mechanically draw the receptacle plate 74 back into the fully retracted position illustrated in FIG. 2 in the event of an air pressure failure within the spring brake chamber 14', or if there is a need to cage the compression spring 80 in order to dismantle the brake or otherwise render the spring brake 14 inoperable.

Figure 3:
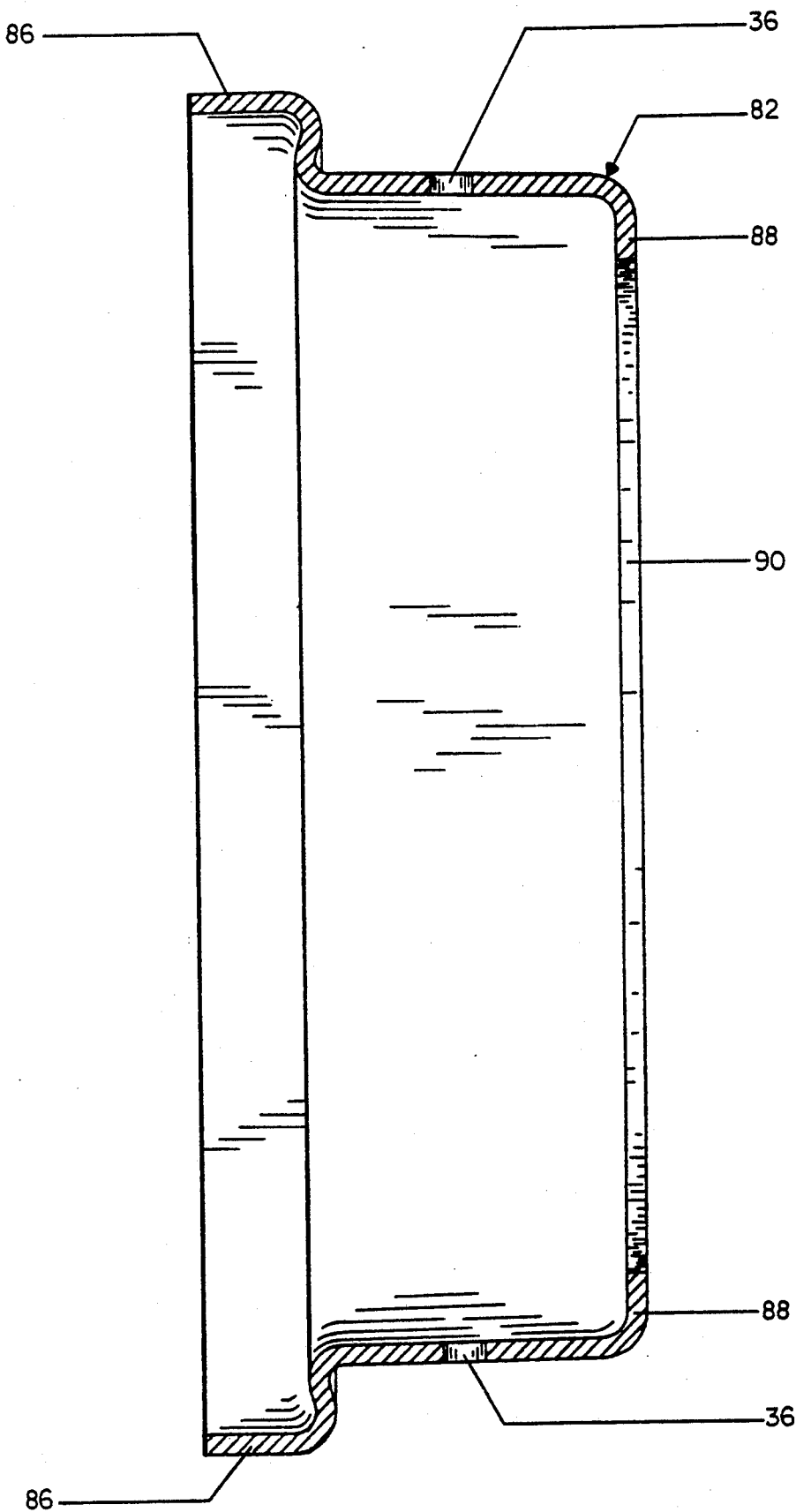
FIG. 3 is a cross-sectional view of the service brake housing used in the invention prior to being mounted to the adapter housing.

Referring now to FIGS. 3 through 5, it will be seen that the service brake housing 22 comprises two parts, a generally cylindrical housing portion 82 and a central plate assembly 84. As shown best in FIG. 3, the cylindrical housing portion 82 has an outwardly directed annular flange 86 on one end and an inwardly directed annular flange 88 on another end. The outwardly directed flange 86 is adapted to form over a flange on the adapter housing 24 by swaging to form the seal 28. Alternatively, as represented in the insert to FIG. 3, the seal 28 can be formed by outwardly directed flange 86', the service diaphragm clamp and the adapter housing flange being clamped together with a clamp band (not shown). The inwardly directed flange 88 defines a center opening 90. Thus, the housing portion 82 and the adapter housing 24 at least partially define a service brake chamber 12'.

Referring now to FIGS. 4 and 5, it can be seen that the central plate 84 has an annular shoulder 92 at the periphery thereof and an aperture 94 centrally located and extending through the plate 84. The housing portion 82 and the plate 84 are formed of steel to provide strength and to facilitate forming the seal 28.

Mounting studs 96 are secured as by welding or by interference press fit knurls to the central plate 84 adjacent the annular shoulder 92. Each stud 96 has a head 98 and a threaded end 100. A steel stiffener 102 is secured to the plate as by welding or by press fit of the stud 96 to provide additional strength for the mounting studs 96. The threaded end 100 of each mounting stud 96 projects through a stiffener 102 and the central plate 84 so that the head 98 may be secured to the stiffener 102.

Referring again to FIG. 2, it will be seen that the central plate 84 is disposed within the central opening 90 of the housing portion 82 so that the annular shoulder 92 mounts on the inwardly directed annular flange 88. The service brake push rod 40 is mounted in the service brake chamber 12' for reciprocation within the opening 94 of the central plate 84, and carries a pressure plate 104 at an inner end thereof. A first indicium 106 is integral with push rod 40 near the pressure plate 104 and so positioned on the push rod that it will begin to emerge from the opening 94 when the push rod 40 has approximately one-half inch of stroke remaining as it moves to an operative position in a manner described hereinafter. A second indicium 108 may likewise be integral with push rod 40 and located intermediate the first indicium 106 and the clevis 42. A compression spring 110 extends between the central plate 84 and the pressure plate 104. The spring 110 thus urges the pressure plate 104 and the service brake push rod 40 to the fully retracted position as viewed in FIG. 2. The fully retracted position may be defined as the inoperative position in which the brakes are released. The spring 110 also urges the central plate 84 outwardly to retain the shoulder 92 in abutment with the inwardly directed flange 88. However, the central plate 84 remains free to rotate with respect to the housing portion 82 so that the mounting studs 96 can therefore rotate about a central axis with respect to the adapter housing 24.

A second elastomeric diaphragm 112 (also known as the service brake diaphragm) is mounted within the service brake chamber 12' and is clamped between the housing portion 82 and the adapter housing 24 within the formed seal 28 or by means of a clamping band. The spring biased pressure plate 104 forces the diaphragm 112 against the divider wall 50 of the adapter housing 24 to the inoperative position as shown in FIG. 2.

In operation, when air is supplied through the service port 30 as, for example, when the brakes are applied by a vehicle operator, air pressure is introduced between the diaphragm 112 and the divider wall 50, thereby forcing the diaphragm 112 toward the central plate 84. In this manner, the push rod 40 is reciprocated to an operative position toward the right of FIG. 2. Air pressure is continually supplied to the portion of the spring brake chamber 14' between the adapter housing 24 and the diaphragm 58 to maintain the spring diaphragm 58, and thus the push-rod adapter 60, essentially in the retracted position illustrated in FIG. 2. In this position, the push rod 40 is normally operated as described above by selective pressurization of air into the service brake chamber 12' through the service port 30. However, in the event of failure of the air pressure system or by application of a parking brake (not shown), the pressure in the spring brake chamber 14' will be decreased so that the springs 66, 110 would no longer be able to overcome the force of the much larger and stronger compression spring 80. Thus, the pressure plate 78 forces the spring diaphragm 58, and thus the adapter push rod 60 in a direction along a longitudinal axis of the push rod 60, thereby also forcing the push rod 40 to an operative position applying the braking pressure to the brakes.

The brake 10 is mounted to a vehicle by securing the mounting studs 96 to a mounting support or bracket (not shown) with nuts 112 and lock washers 114. In mounting the brake 10 to the vehicle, it can be seen that prior to tightening the nuts 112 on the mounting studs 96 to the mounting support, the entire brake 10 can be rotated generally about a longitudinal axis to align the pneumatic ports 30, 32 to a preselected position because the central plate 84 to which the mounting studs 96 are rigidly secured, is free to rotate with respect to the service brake housing 82.

Since different vehicles have air supply lines or conduits which terminate in differing relationships to the mounting supports for the brake, the present invention permits rotation of the brake during installation to align the ports to meet the air supply lines. With this structure, then, a single brake can be provided which is adapted to fit a number of different vehicles, regardless of the configuration of air conduits directed to the brake.

Reasonable variation and modification are possible within the scope of the foregoing disclosure without departing from the spirit of the invention as defined in the appended claims.

The embodiments of the invention in which an exclusive property or privilege is claimed are defined as follows:

1. In an air-operated diaphragm brake for a vehicle having a mounting support and a pneumatic supply line, said brake comprising a housing which at least partially defines a chamber, a push rod extending outwardly from within the chamber for reciprocating movement along a generally longitudinal axis thereof between operative and inoperative positions, a diaphragm within said chamber for actuating the push rod in response to the delivery and exhaust of pressurized air, and a pneumatic port in the housing for receiving air from the pneumatic supply line, the improvement comprising:

said housing having first and second members, said first member being adapted to be fixedly mounted to the mounting support, said pneumatic port being located on the second member; and said first and second members having interengaging portions to permit movement of the second member and the pneumatic port with respect to the first member in a manner whereby the housing can be mounted to different vehicles which have different relationships between mounting supports and pneumatic supply lines.

2. An air-operated diaphragm brake according to claim 1 wherein the second member has an end section and an oblique side surface, said push rod projecting through the end section and said pneumatic port being located on the side surface, and the first member comprises a plate rotatably mounted to said end section for rotation about the longitudinal axis, said plate having a central aperture for receiving the push rod.

3. An air-operated diaphragm brake according to claim 2 wherein the plate has a pair of threaded studs fixedly secured thereto for mounting said plate to the vehicle.

4. An air-operated diaphragm brake according to claim 3 wherein the end section has an inwardly directed annular flange defining an opening, the plate is circular and has a peripheral shoulder, and the shoulder mounts the annular flange so that the plate is disposed within the opening and the studs project outwardly of the housing.

5. An air-operated diaphragm brake according to claim 4 and further comprising a spring disposed within the chamber to urge said shoulder into abutting engagement with the annular flange.

6. An air-operated diaphragm brake according to claim 5 wherein said spring is further adapted to urge the push rod into the inoperative position.

7. An air-operated diaphragm brake according to claim 6 wherein the spring has a first end adjacent the diaphragm and a second end adjacent the plate whereby the second end is centered about the central aperture.

8. An air-operated diaphragm brake according to claim 2 wherein the end section has an inwardly directed annular flange defining an opening, the plate is circular and has a peripheral shoulder, and the shoulder mounts the annular flange so that the plate is disposed within the opening.

9. An air-operated diaphragm brake according to claim 8 and further comprising a spring disposed within the chamber to urge said shoulder into abutting engagement with the annular flange.

10. An air-operated diaphragm brake according to claim 9 wherein said spring is further adapted to urge the push rod into the inoperative position.

11. An air-operated diaphragm brake according to claim 10 wherein the spring has a first end adjacent the diaphragm and a second end adjacent the plate whereby the second end is centered about the central aperture.

12. In an air-operated diaphragm brake for a vehicle having a mounting support and a pneumatic supply line, said brake comprising a housing which at least partially defines a chamber, said housing having an end section and an oblique side surface, a push rod extending through the end section from within the chamber for reciprocating movement along a generally longitudinal axis thereof between operative and inoperative positions, a diaphragm within said chamber for actuating the push rod in response to the delivery and exhaust of pressurized air, and a pneumatic port on the side surface for receiving pressurized air from the pneumatic supply line, the improvement comprising:

mounting means independent of the pneumatic port movably disposed on the housing for mounting the brake to the vehicle, said mounting means comprising a plate rotatably mounted to the end section for rotation about the longitudinal axis, said plate having an aperture for receiving the push rod and a pair of threaded studs fixedly secured thereto for mounting the plate to the mounting support;

said housing and said mounting means having interengaging portions to permit movement of the mounting means with respect to the pneumatic port so that the housing may be mounted to different vehicles which have different relationships between mounting supports and pneumatic supply lines.

13. An air-operated diaphragm brake according to claim 12 wherein the end section has an inwardly directed annual flange defining an opening, the plate is circular and has a peripheral shoulder, and the shoulder mounts the annular flange so that the plate is disposed within the opening and the studs project outwardly of the housing.

14. An air-operated diaphragm brake according to claim 13 and further comprising a spring disposed within the chamber to urge said shoulder into abutting engagement with the annular flange.

15. An air-operated diaphragm brake according to claim 14 wherein said spring is further adapted to urge the push rod into the inoperative position.

16. An air-operated diaphragm brake according to claim 15 wherein the spring has a first end adjacent the diaphragm and a second end adjacent the plate whereby the second end is centered about the central aperture.

17. An air-operated diaphragm brake according to claim 16 wherein the end section has an inwardly directed annular flange defining an opening, the plate is circular and has a peripheral shoulder, and the shoulder mounts the annular flange so that the plate is disposed within the opening.

18. An air-operated diaphragm brake according to claim 17 and further comprising a spring disposed within the chamber to urge said shoulder into abutting engagement with the annular flange.

19. An air-operated diaphragm brake according to claim 18 wherein said spring is further adapted to urge the push rod into the inoperative position.

20. An air-operated diaphragm brake according to claim 19 wherein the spring has a first end adjacent the diaphragm and a second end adjacent the plate whereby the second end is centered about the central aperture.

* * * * *